United States Patent [19]

Basadur

[11] 3,985,923

[45] Oct. 12, 1976

[54] PROCESS FOR IMPARTING RENEWABLE SOIL RELEASE FINISH TO POLYESTER-CONTAINING FABRICS

[75] Inventor: Marino S. Basadur, Cincinnati, Ohio

[73] Assignee: The Procter & Gamble Company, Cincinnati, Ohio

[22] Filed: Jan. 17, 1975

[21] Appl. No.: 541,964

Related U.S. Application Data

[60] Division of Ser. No. 328,824, Feb. 1, 1973, Pat. No. 3,893,929, which is a continuation-in-part of Ser. No. 193,569, Oct. 28, 1971, abandoned.

[52] U.S. Cl. ............................. 427/390 E; 252/8.6; 260/29.2 E
[51] Int. Cl.² ..................... C08J 1/44; D06M 13/20
[58] Field of Search ................ 252/8.6; 260/29.2 E; 428/481; 427/390

[56] References Cited

UNITED STATES PATENTS

| | | | |
|---|---|---|---|
| 3,360,494 | 12/1967 | Bolinger | 252/8.6 X |
| 3,681,244 | 8/1972 | Obetz | 252/8.6 X |

*Primary Examiner*—Bernard D. Pianalto
*Attorney, Agent, or Firm*—Richard C. Witte; Thomas H. O'Flaherty; Julius P. Filcik

[57] ABSTRACT

Process for improving the subsequent removability of oily soils and stains from polyester-containing fabrics through application of a renewable soil release finish to said fabrics from a dilute aqueous solution having an acid pH.

11 Claims, No Drawings

PROCESS FOR IMPARTING RENEWABLE SOIL RELEASE FINISH TO POLYESTER-CONTAINING FABRICS

This application is a divisional application of application U.S. Ser. No. 328,824, filed Feb. 1, 1973, now U.S. Pat. No. 3,893,929, issued July 8, 1975, which is a continuation-in-part of application U.S. Ser. No. 193,569, filed Oct. 28, 1971, now abandoned.

BACKGROUND OF THE INVENTION

This invention relates to a composition and process for enhancing subsequent soil removal from fabrics. More particularly it relates to a composition and process whereby subsequent removal of oily soil and stains from fabrics woven from polyester fibers, and from fabrics which employ combinations of polyester fibers and other fibers (e.g. 65% polyester, 35% cotton blends), is enhanced by applying to said fabrics, in an aqueous solution, a soil release agent which imparts hydrophilic character to the polyester fiber, said solution having an acid pH. As used herein, the term "solution" refers to dispersion as well as true solution.

As is well known in the art, fabrics which are woven from polyester fibers, the most common of which being copolymers of ethylene glycol and terephthalic acid, and being sold under a number of trade names, e.g., Dacron, Fortrel, Kodel and Blue C Polyester, tend to be quite hydrophobic. The hydrophobic character of these fabrics prevents or reduces the ability of water to wet the fabric, which is necessary to remove oily soil and oily stains during the washing process. Since the inherent character of the fabric itself is hydrophobic, or oleophilic, once an oily soil or oily stain is deposited on the fabric, either by normal use or by accident, the oily soil or oily stain tends to be "attached" to the surface of the fiber, and as a result the oily soil or stain is difficult to remove in the laundering process. Other fabrics such as cotton can be dirtied by oily stains or oily soil in the same manner as polyester fabrics. However, because cotton fibers are more hydrophilic in nature than polyester fibers, oily stains and oily soil are more easily removed from cotton fabrics, due to a greater affinity of the fabric for water. This difference in hydrophilic/hydrophobic character is due in part to the basic building blocks of the fibers themselves, i.e., since polyester fibers are copolymers of terephthalic acid and ethylene glycol, they have less affinity for water because there are fewer free hydrophilic groups, e.g., hydroxyl or carboxyl groups where hydrogen bonding can occur, than is the situation with cotton which is a cellulose derivative containing a large number of hydrophilic groups which are compatible with and have affinity for water.

As a result of cotton's hydrophilic nature, when an oily soil stain is present in a cotton fabric which is laundered, the soil tends to "ball-up" into a droplet on contact with water just as oil droplets form on the surface of an oil/water mixture. Through the mechanical action of washing and the action of synthetic detergents and builders normally used in the washing step of the laundering process, this droplet is removed from the fabric. This is in contrast to the situation which exists with a polyester fiber in that water does not "wick" through the fabric as well and thus the oily soil or stain tends to be retained throughout the fabric because of the inherent hydrophobic character of the fabric and the lack of affinity of oily soils for water.

Because of the fact that polyester and polyester-blend fabrics (e.g. polyester-cotton blends) are susceptible to oily staining, and the fact that once stained the fabric is difficult to clean, manufacturers of polyester fibers and of polyester fabrics and blends have sought to increase the hydrophilic character of the polyester so that on laundering the fabric will be easily cleaned.

A number of approaches toward building more hydrophilic character into polyester fabrics and fabrics which are blends of cotton fibers and polyester fibers have been taken. All of these approaches involve a proces applied by the textile-fiber manufacturer or the textile manufacturer. Netherlands Application 65/09456 [see also D. A. Garrett and P. N. Hartley, *I. Soc. Dyers and Colourists*, 82, 7, 252–7 (1967) and *Chem. Eng. News*, 44, 42–43 (Oct. 17, 1966)] describes the treatment of polyester fabrics in which a copolymer of terephthalic acid with a polyethylene glycol is padded on the polyester fiber using an emulsion, containing a 20% concentration of the padding agent, a polyester swelling agent such as benzyl alcohol, and heat. The object of this treatment is to give the basic polyester fiber more hydrophilic character, thereby reducing the tendency of the polyester fiber to retain oily stains.

Other finishing techniques on polyester fabrics can be found in the art. For example, German Patent No. 1,194,363 describes the use of a polyethylene glycol-itaconic acid polymer as an anti-static agent for synthetic fibers to reduce soil pickup. Netherlands Application No. 65/02428 and Belgium Patent No. 641,882 describe the treatment of polyester fibers with polyethylene glycol solutions to increase the hydrophilic character of the fiber. In addition French Patent No. 1,394,401 describes the treatment of a polyester fiber with an alcohol or glycol in the presence of a strong non-volatile acid to increase the hydrophilic character of the fabric.

As can be seen from the prior art hereinbefore described it is well known that fabrics woven from polyester fibers and polyester/cotton fiber blends do not respond the same way during laundering as do typical cotton fabrics. It is well recognized that the problem with polyester and polyester/cotton blends is that because of the hydrophobic character of the fabrics they tend to stain easily with oily soil, and once stained, the oily soil or stain is difficult to remove. In fact it is well known that polyester fabrics tend to be oil scavengers, i.e., they tend to attract soils of an oily nature from the wash water during laundering.

Thus the textile trade has sought to change the inherent characteristics of the polyester fiber either by building into the polyester fiber greater hydrophilic character or by causing the fabric to have greater hydrophilic character through adsorption on the surface of the fiber of materials more hydrophilic in nature than the base polyester fiber. The approaches which have been used heretofore are all involved in the finishing process of the fiber or fabric itself by the fiber or fabric manufacturer and are not associated with the laundering process of the fabric. As a result the treatment received by the polyester fiber or fabric occurs only once and the increase in hydrophilic character is reduced with successive laundering. In some cases the textile finishing process to increase the hydrophilic character of the fabric can be rendered completely ineffective if laundering is done under severe conditions, e.g., in commercial laundries where high pH and high temperature washing conditions are used. Once the hydrophilic characteristics accorded the fiber or fabric have been removed or rendered substantially less effective by subsequent laundering the fabric reverts to its inherent hydrophobic character with the result that oily soils are again very difficult to remove from the fabric.

DESCRIPTION OF THE INVENTION

This invention concerns a process whereby soil release agents, hereinafter described more fully, can be applied to polyester-containing fabrics from dilute, aqueous, acid solution, preferably the rinse step of laundering, in order to effect easier removability of oily soils in subsequent washing. In addition this invention concerns compositions of matter for use in said process.

In its broadest aspect, this invention concerns an improvement in the laundering of polyester-containing fabrics wherein a renewable soil release finish is applied to said fabrics from a dilute aqueous acidic solution of a soil release agent (hereinafter defined), thereby making oily soils which are subsequently deposited on the fabric more easily removable in the next laundering. Preferably, the renewable soil release finish is applied in the final rinse step of the laundering process so as to facilitate the removal of subsequently deposited oily soils in the next laundering.

The soil release agents of the invention are copolymers comprising:

1. a dibasic carboxylic acid of the following general formula

HOOC—A—COOH wherein A is a bivalent organic radical selected from the group consisting of alkylene, arylene, aralkylene, alkarylene and cylcoalkylene radicals having from 3 to about 14 carbon atoms, 2. a glycolic compound which is a polyglycol selected from the group consisting of compounds of the following general formula

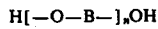

H[—O—B—]$_n$OH wherein B is a bivalent organic radical selected from the group consisting of alkylene and cycloalkylene radicals having from 2 to about 4 carbon atoms, and wherein n indicates the degree of polymerization and ranges from about 6 to about 500, and preferably, although not essential for the operability of the invention, 3. a glycolic compound which is a glycol selected from the group consisting of compounds having the following general formula

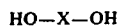

HO—X—OH wherein X is a bivalent organic radical selected from the group consisting of alkylene and cyclalkylene radicals having from 2 to about 4 carbon atoms, and wherein the molar ratio of dibasic acid to total glycolic compounds is 1:1 and the average molecular weight of the copolymer is from about 1000 to about 100,000. Since these copolymers contain no free acid groups, they are substantially neutral.

With respect to Component (1), where A is an alkylene radical, examples of suitable radicals are propylene, butylene, pentylene, octylene, (methylene) ethylene (i.e.

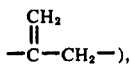

(dodecylene and tetradecylene; where A is an arylene radical, examples of suitable radicals are phenylene and biphenylene; where A is an aralkylene radical, examples of suitable radicals are 2-phenylpropylene and 2-phenylbutylene; where A is an alkarylene radical, examples of suitable radicals are 2-propylphenylene and 2-ethylphenylene; and where A is a cycloalkylene radical, examples of suitable radicals are cyclobutylene, cyclopentylene, cyclohexylene, cyclooctylene and cyclotetradecylene. The preferred radical is phenylene with the preferred dicarboxylic acid being terephthalic acid, because terephthalic acid is an integral part of the polyester sought to be rendered hydrophilic. Butylene, biphenylene, and (methylene) ethylene are also preferred.

With respect to Component (2), when B is an alkylene radical, examples of suitable radicals are ethylene, propylene, and butylene. When B is a cycloalkylene radical, examples of suitable radicals are cyclopropylene and cyclobutylene. The preferred radical is ethylene and the preferred polyglycol is polyethylene glycol. Polyethylene glycol is preferred because it is the most hydrophilic of the polyglycols which can be used.

It should be noted that Component (2) which is a polyglycol, has a degree of polymerization of from about 6 to about 500, e.g., from about 6 to about 500 alkenoxy or cycloalkenoxy groups make up the polyglycol chain. The polyglycol can be a homopolymer of the individual glycol. The polyglycol can be copolymers of mixtures of the individual glycols, with the individual glycols being randomly distributed in the polyglycol copolymer chain. In addition the polyglycol can be copolymers of mixtures of homopolymers of the individual glycols with the homopolymers being randomly distributed in the polyglycol copolymer chain. A homopolymer of ethylene glycol is the preferred polyglycol. The degree of polymerization of from about 6 to about 500 results in a polyglycol molecular weight of from about 300 to about 20,000. The preferred polyglycol degree of polymerization is from about 30 to about 40 with a molecular weight of from about 1300 to about 1800.

With respect to Component (3), which is an optional component of the copolymers of the invention, when X is an alkylene radical, examples of suitable radicals are ethylene, propylene and butylene. When X is a cycloalkylene radical, examples of suitable radicals are cyclopropylene and cyclobutylene. The preferred radical is ethylene and the preferred glycol is ethylene glycol.

The soil release agent which is a copolymer in a 1:1 molar ratio of dibasic acid to total glycolic compounds, hereinbefore described, more specifically can be, for example, copolymers of terephthalic acid with polyethylene glycol, with polyethylene glycol and ethylene glycol, with polypropylene glycol, with polypropylene glycol and ethylene glycol, and with a copolymer of ethylene glycol and propylene glycol; copolymers of adipic acid with polyethylene glycol, with polyethylene glycol and ethylene glycol, with polypropylene glycol, with polypropylene glycol and ethylene glycol and with a copolymer of ethylene glycol and propylene glycol;

and copolymers of itaconic acid with polyethylene glycol, with polyethylene glycol and ethylene glycol, with polypropylene glycol, with polypropylene glycol and ethylene glycol, and with a copolymer of ethylene glycol and propylene glycol. All copolymers of the invention comprise the dibasic acid and glycolic compounds in a 1:1 molar ratio and said copolymers have an average molecular weight of from about 1000 to about 100,000. Preferably, when the glycolic component of the polymer comprises a polyglycol and a glycol, the molar ratio of polyglycol to glycol is from about 5:1 to about 1:5.

The preferred soil release agent is a copolymer of tetrephthalic acid, a polyethylene glycol having a degree of polymerization of about 35, and ethylene glycol, the three components being present in a molar ratio of acid:polyglycol:glycol of 1:0.8:0.2 to 1:0.2:0.8 (i.e. a 1:1 molar ratio of acid to total glycolic compounds, and a 4:1 to 1:4 ratio of polyglycol to glycol) the average molecular weight of said polymer being about 3000 to about 5000. The most preferred ratio of terephthalic acid to polyethylene glycol to ethylene glycol for this polymer is 1:0.45:0.55.

A method for preparing copolymers of the type suitable for use in the invention herein is disclosed in U.S. Pat. No. 3,416,952 issued Dec. 17, 1968.

When the soil release agents hereinbefore described are present in a dilute aqueous solution into which polyester or polyester-blend fabrics are immersed, the soil release agents tend to adsorb onto the polyester fibers, forming a hydrophilic film which remains on the fibers after the fabric is removed from the solution and dried. This film makes the polyester fibers more wettable and thus oily soils and stains deposited on the fabric prior to the next laundering are more easily removed in said laundering than if the soil release agent were not present on said polyester fibers. Most of the soil release agent deposited on the polyester fibers from an aqueous bath, as described above, is removed in the first subsequent laundering, therefore it is preferable to apply a new film of soil release agent in the rinse step after each laundering. If the laundering process has several rinses, it is preferred that the soil release agent be applied in the last rinse, since subsequent rinses after application will remove some of the soil release agent from the fabric. By renewing the soil release finish after each laundering in the manner described above a relatively high and constant level of soil release performance is maintained on the fabric throughout its life.

It has been found, according to the present invention, that the previously described soil release agents are much more effectively deposited on the fabric from a dilute aqueous bath, if said bath has an acid pH, preferably a pH between about 3.0 and 7.0, and more preferably between about 3.5 and 6.5. Use of acid pH in the aqueous bath imparts to the polyester-containing fabrics significantly improved soil release properties for a given level of soil release agent, thus permitting the use of relatively low levels of the soil release agent and giving consequent benefits in economy.

When applied at acid pH according to the invention herein, the soil release agents are used at concentrations of from about 0.001% to about 1.0% by weight in the aqueous bath. Preferably the concentration of soil release agent is from about 0.004% to about 0.25% by weight. The amount of fabric in the aqueous bath can vary widely, but is generally from about 1% to 50% by weight of the water and is preferably from about 3% to about 25% of the water.

It is generally preferable to have an emulsifying agent present in the aqueous bath containing the soil release agent to aid in keeping said agent evenly dispersed. Emulsifying agent levels of from about 0.00005 to about 0.05% of this aqueous solution are suitable for this purpose. A discussion of suitable emulsifying agents is given later in this specification.

The temperature of the aqueous bath can be from about 50° F to about 212° F, but is preferably from about 100° F to about 130° F. The length of time the fabrics are present in the aqueous bath should be at least 0.5 minutes and is preferably from about 2 to about 9 minutes. The water hardness of the aqueous bath is not critical to the practice of the invention.

As hereinbefore mentioned, it is preferable that the soil release agent be applied to the fabric in the final rinse step of the laundering operation. In commercial laundering the use of acid pH (sour) in the final rinse step (usually the last of several rinses) is common practice, therefore the use of the present invention in commercial laundering involves no basic change in customary practice. In home laundering, however, rinsing is normally performed at a pH of about 7 to 9, therefore the present invention does require a departure from common practice in the home.

Of course, the soil release agents of the invention need not necessarily be applied to the polyester-containing fabric in the rinse step of a laundering operation but may be applied to the fabric from a dilute acidic aqueous solution at any time prior to the soiling of the fabric.

Generally any acidic compound (i.e. acid or acid salt) which can impart the desired pH to the aqueous solution of soil release agent is suitable for use herein. The acidic compounds can be organic or inorganic, the only requirement being that they be soluble in water to a sufficient extent to provide the required acidity. Preferred acidic compounds are those which have found wide use in commercial laundering such as fluosilicic acid, sodium silicofluoride, ammonium silicofluoride ammonium acid fluoride, acetic acid sodium acid fluoride, and hydrochloric acid. Generally the fluorine-containing acids and acid salts are preferred because they are effective in removing rust stains in addition to providing acidity. Normally the acidic compound is used in the aqueous solution of soil release agent at a level of about 0.001% to about 0.04% by weight, to achieve the desired pH, the actual usage level depending on the degree of acidity of the compound, the natural pH of the water supply, and the amount of alkalinity carried into the solution by the fabrics to be treated.

The soil release agents of the invention and the acidic compounds can be added separately to water at the desired concentrations to provide the acid solutions of soil release agents for use herein, or the acidic compounds and soil release agents can be formulated into a single concentrated composition which can be dissolved in water to provide the desired acidic solution of soil release agent. The concentrated compositions herein generally comprise from about 2.5% to about 95% acidic compound and from about 97.5% to about 5% soil release agent by weight. The type and level of acidic compound in the composition is chosen so as to provide an acidic pH when the composition is added to water in an amount so as to provide a concentration of soil release agent between about 0.001% and about 1.0% by weight.

The concentrated composition can also contain diluents such as salts (e.g. $Na_2SO_4$ or NaCl) or solvents (e.g. water or alcohol) and can be formulated in solid, granular, powder, paste or liquid form. Preferably the diluents should be water soluble. It is preferable that emulsifiers or dispersing agents be present in the compositions. These can be surface active agents of the anionic, nonionic, ampholytic or zwitterionic type and normally comprise from about 0.1 to 10% by weight of the composition. Examples of suitable anionic surface active agents are sodium salts of fatty alcohol sulfates having from 8–18 carbon atoms in the fatty chain and sodium salts of alkyl benzene sulfonates, having from 9 to 15 carbon atoms in the alkyl chain. Examples of suitable nonionic surface active agents are the polyethylene oxide condensates of alkyl phenols, wherein the alkyl chain contains from about 6 to 12 carbon atoms and the amount of ethylene oxide condensed onto each mole of alkyl phenol is from about 5 to 25 moles. Specific examples are the condensation product of one mole of nonylphenol with 10 moles of ethylene oxide and the condensation product of one mole of $C_{12}$ fatty alcohol and 10 moles of ethylene oxide. Examples of suitable ampholytic surface active agents are derivatives of aliphatic secondary or tertiary amines in which one of the aliphatic substituents contains from about 8 to 18 carbon atoms and one contains an anionic water solubilizing group, e.g. sulfate or sulfo. Specific suitable ampholytic surface active agents are sodium-3-dodecylaminopropionate and sodium-3-dodecyl amino propane sulfonate. Examples of suitable zwitterionic surface active agents are derivatives of aliphatic quaternary ammonium compounds in which one of the aliphatic constituents contains from about 8 to 18 carbon atoms and one contains an anionic water solubilizing group. Specific examples of zwitterionic surface active agents are 3-(N,N-dimethyl-N-hexadecylammonio) propane-1-sulfonate and 3-(N,N-dimethyl-N-hexadecylammonio)-2-hydroxy propane-1-sulfonate. Many other suitable surface active agents are described in Detergents and Emulsifiers — 1969 Annual by John W. McCutcheon Inc. which is incorporated by reference herein.

Other textile treating agents such as blueing, optical brighteners and the like can be present in the aqueous acid solution of soil release agent herein, in order to provide simultaneous application of these textile treating agents along with the application of soil release agent. Likewise, such textile treating agents can be incorporated into the concentrated compositions herein. Cationic fabric softeners (e.g. ditallow dimethyl ammonium chloride) can also be present in the compositions and process of the invention but generally their presence is not preferred since they tend to retard the deposition of the soil release agent onto the polyester fibers at acid pH.

Previous patents have described aqueous acidic compositions containing the soil release agents of the present invention. For example British Patent No. 1,119,367, published July 10, 1968, discloses acidic aqueous compositions which contain the soil release agent and a "swelling agent", the swelling agent being defined as a material which is capable of causing a swelling of the polyester fibers to which the soil release agent is applied. The patent states that compounds which are capable of inducing crystallization in transparent amorphous polymer films, made from the fiber-forming polyester, are suitable swelling agents for use in the compositions described therein. Examples of suitable swelling agents are stated to be benzyl alcohol, o-phenylphenol, benzaldehyde and chloroform. The compositions described in British Patent No. 1,119,367 are said to impart permanent soil release finish to the polyester fiber, and this permanence is made possible by the use of the swelling agent. The present invention is intended to provide a non-permanent (i.e. renewable) soil release finish and therefore the compositions and method of the present invention are substantially free of swelling agents. U.S. Pat. No. 3,690,942, issued Sept. 12, 1972 discloses acidic formulations for imparting a durable soil release finish to polyester fabrics said formulations containing a soil release agent of the present invention in combination with a synthetic acid emulsion polymer, (i.e. polymers which contain free acid groups) for example polymers made from acrylic acid, methacrylic acid, fumaric acid, maleic acid, and the like. Here again, since the present invention is intended to produce a non-permanent soil release finish, the compositions and process of the present invention are substantially free of synthetic acid emulsion polymers.

The invention will be further illustrated by the following examples.

EXAMPLE I

White 100% polyester fabric (Type 56 S/715 Textile Double Knit from Test Fabrics Inc. of New York, N.Y.) was washed in 0.5% concentration of a commercial laundry detergent having the following composition by weight

| Anionic synthetic detergent | 4.2% |
|---|---|
| Nonionic synthetic detergent | 4.1 |
| Sodium tripolyphosphate | 12.4 |
| Sodium carbonate | 18.5 |
| Sodium hydroxide | 15.5 |
| Sodium metasilicate | 34.5 |
| Moisture and misc. | to 100 |

The washing was done at 180° F for 10 minutes, followed by four rinses at 160° F., 140° F, 120° F, and 100° F, respectively. Soft water (0 grains/gallon $CaCO_3$ equivalent) was used in all washes and rinses. The fabric was then cut into 5.5 inch square swatches for testing.

Five 260 gram batches of test swatches (approximately 73 swatches per batch) were weighed out. Four batches of swatches were given a soil release treatment in soft water rinse solutions, the composition and pH of which are indicated in Table 1. The treatment consisted of immersing the fabrics in the rinse solution for 5 minutes at a temperature of 120° F. The fabrics were then dried. 10 swatches from each of the five batches were then soiled with 1.6 ml of dirty crankcase oil by dropping the oil from a syringe onto the center of the swatch. The soil was allowed to set for approximately 10 minutes, and the light reflectance of the soiled spots as well as the light reflectance of the unsoiled swatches was determined by the "L" reading on a Gardner XL-10 Color Difference Meter (Gardner Laboratories, Chicago, Illinois). The five separate batches of test swatches were then washed according to the procedure described above, except that a second wash at 0.1% detergent concentration was inserted after the first wash and before the 160° F. rinse, and 1.6 ml of crankcase oil was added to the first 180° F. wash solution, approximately 2.5 minutes after the first 180° F. wash had started. After the final 100° F. rinse the swatches were dried and reflectance readings were again taken. % soil removal from the soiled swatches was calculated according to the following formula $$\frac{L \text{ (washed)} - L \text{ (soiled)}}{L \text{ (original)} - L \text{ (soiled)}} \times 100 = \% \text{ soil removal}$$

Likewise, whiteness retention of the unsoiled swatches was calculated according to the following formula $$\frac{L \text{ (washed)}}{L \text{ (original)}} \times 100 = \% \text{ whiteness retention}$$

Results are shown in Table 1.

TABLE 1

|  | 1 | 2 | 3 | 4 | 5 |
|---|---|---|---|---|---|
| % soil release agent* in soil release treatment | Control** | 0.051 | 0.051 | 0.051 | 0.051 |
| pH of soil release treatment | — | 8.0–8.2 | 6.0–7.1 | 4.0–3.9 | 3.5 |
| % NaHF$_2$ in soil release treatment | — | 0 | 0.0027 | 0.0067 | 0.04 |
| % soil removal | 28 | 55.3 | 71.0 | 73.9 | 81.0 |
| % whiteness retention | 91.4 | 90.4 | 92.4 | 92.4 | 93.5 |

*The soil release agent is a copolymer of terephthalic acid, polyethylene glycol having a degree of polymerization of about 35, and ethylene glycol, the ratio of tere-phthalic acid: polyethylene glycol:ethylene glycol being 1:0.45:0.55 and the average molecular weight being from about 3000 to about 5000.
**The control received no rinse soil release treatment.

The above results demonstrate clearly the superior soil release performance which is obtained by applying a soil release agent of the invention to polyester fabrics in a dilute rinse solution prior to subsequent soiling and laundering. The results further demonstrate the increase in soil release performance which is obtained by applying said soil release agent in an acid rinse.

The soil release agent of the above experiment is replaced on an equal weight basis by the following soil release agents, and trends in soil removal and whiteness retention results substantially similar to those reported above are obtained.

1. A copolymer of terephthalic acid, polypropylene glycol having a degree of polymerization of about 40, and ethylene glycol, in a molar ratio of 1:0.78:0.22 and having an average molecular weight of about 4,000 to 6,000.
2. A copolymer of adipic acid, polyethylene glycol having a degree of polymerization of about 40, and ethylene glycol, in a molar ratio of 1:0.78:0.22, and having an average molecular weight of about 3,000 to 5,000.
3. A copolymer of adipic acid, and polypropylene glycol having a degree of polymerization of about 40, in a molar ratio of 1:1, said copolymer having an average molecular weight of about 4,000 to 6,000.
4. A copolymer of itaconic acid, polyethylene glycol having a degree of polymerization of about 30, and ethylene glycol, in a molar ratio of 1:0.78:0.22, and having an average molecular weight of about 3,000 to 5,000.
5. A copolymer of itaconic acid, and polypropylene glycol having a degree of polymerization of about 40, in a molar ratio of 1:1, said copolymer having a molecular weight of about 4,000 to 6,000.

Other copolymers are substituted on an equivalent basis for the copolymer of terephthalic acid, polyethylene glycol, and ethylene glycol to obtain substantially equivalent results, wherein the polyethylene glycols in the copolymers have respective degrees of polymerization of 10, 200 and 450 and the copolymers have respective molecular weights of about 2,000 50,000 and 80,000. Likewise, the following acidic compounds are substituted for NaHF$_2$ in amounts sufficient to produce the same pH's as in the above experiment and trends in soil removal and whiteness retention substantially similar to those reported above are obtained: fluosilicic acid, sodium silicofluoride ammonium acid fluoride, acetic acid and hydrochloric acid.

EXAMPLE II

A liquid concentrate soil release composition is prepared by mixing the following ingredients

| Soil release agent* | 14.5 parts |
|---|---|
| Emulsifier** | 0.5 |
| NaHF$_2$ | 2.5 |
| Water | to 100 parts |

*A copolymer of terephthalic acid, polyethylene glycol having a degree of polymerization of about 35 and ethylene glycol, the ratio of terephthalic acid: polyethylene glycol: ethylene glycol being 1:0.45:0.55 and the average molecular weight being from about 3000 to about 5000
**The condensation product of a mixture C$_{11}$ to C$_{15}$ secondary alcohols and ethylene oxide wherein the molar ratio of ethylene oxide to alcohol is about 9:1.

The composition is a cloudy, easily pourable, single phase liquid. The composition is dissolved in water at the rate of 0.35 parts of composition per 100 parts water to form a dilute solution of soil release agent having pH of about 5, said solution being suitable for applying the soil release agent to polyester-containing fabrics according to the process of the present invention.

EXAMPLE III

A solid concentrate soil release composition is prepared by mixing the following ingredients

| Soil release agent* | 83 parts |
|---|---|
| Emulsifier** | 3 parts |
| NaHF$_2$ | 34 parts |
|  | 100 parts |

*The soil release agent of the composition of Example II
**The sodium salt of dodecylbenzene sulfonic acid.

The composition is a granular solid. The composition is dissolved in water at the rate of about 0.06 parts composition per 100 parts of water to form a dilute solution of soil release agent having a pH of about 5, said solution being suitable for applying the soil release agent to polyester-containing-fabrics according to the process of the present invention.

What is claimed is:

1. A process for imparting a renewable soil release finish to polyester-containing fabrics comprising:
   A. contacting said fabrics with a dilute aqueous solution of a composition comprising:
      a. from about 5% to about 97.5% of a copolymer comprising:
         1. a dibasic carboxylic acid of the following general formula

HOOC—A—COOH wherein A is a bivalent organic radical selected from the group consisting of alkylene, arylene, aralkylene, alkarylene and cycloalkylene radicals having from 3 to about 14 carbon atoms; and
         2. a glycolic compound which is a polyglycol selected from the group consisting of compounds of the following general formula
         H[—O—B—]$_n$OH wherein B is a bivalent organic radical selected from the group consisting of alkylene and cycloalkylene radicals having from 2 to about 4 carbon atoms, and wherein n indicates the degree of polymerization and ranges from about 6 to about 500, and wherein the ratio of dicarboxylic acid to total glycolic compounds is 1:1 and the the average molecular weight is from about about 1,000 to about 100,000; and
      b. from about 2.5% to 95% of a water soluble acidic compound;
   said copolymer being present in said aqueous solution at a concentration of from about 0.001% to about 1.0% by weight and said aqueous solution being substantially free of synthetic acid emulsion polymers and substances which are capable of causing the swelling of polyester fibers; and
   B. drying said fabrics.

2. The process of claim 1 wherein the bivalent organic radical, A, of the copolymer is selected from the group consisting of phenylene, butylene, biphenylene and (methylene).

3. The process of claim 2 wherein the bivalent organic radical, A, is phenylene.

4. The process of claim 3 wherein the polyglycol is polyethylene glycol.

5. The process of claim 4 wherein the polyethylene glycol has a degree of polymerization of from about 30 to about 40.

6. The process of claim 5 wherein the copolymer contains as a third component a glycol having the following general formula

HO—X—OH wherein X is a bivalent organic radical selected from the group consisting of alkylene and cycloalkylene radicals having from 2 to about 4 carbon atoms.

7. The process of claim 6 wherein X is the ethylene radical and the glycol is ethylene glycol.

8. The process of claim 7 wherein the molar ratio of dicarboxylic acid to polyethylene glycol to ethylene glycol in the copolymer is from about 1:0.8:0.2 to 1:0.2:0.8.

9. The process of claim 8 wherein the average molecular weight of the copolymer is from about 3000 to about 5000.

10. The process of claim 9 wherein the dilute aqueous solution is the rinse bath of a laundering operation.

11. The process of claim 8 wherein the composition contains as an additional ingredient from about 0.1% to about 10% of an emulsifying agent.

* * * * *

UNITED STATES PATENT OFFICE
CERTIFICATE OF CORRECTION

PATENT NO. : 3,985,923
DATED : October 12, 1976
INVENTOR(S) : Marino S. Basadur

It is certified that error appears in the above-identified patent and that said Letters Patent are hereby corrected as shown below:

In Example III, Column 10, line 58, delete "34 parts" and insert therefor -- 14 parts --

In Claim 2, Column 12, line 7, after "(methylene)" and before "." insert -- ethylene --

Signed and Sealed this

Fifteenth Day of March 1977

[SEAL]

Attest:

RUTH C. MASON
*Attesting Officer*

C. MARSHALL DANN
*Commissioner of Patents and Trademarks*